(12) United States Patent
Ryu et al.

(10) Patent No.: US 7,717,990 B2
(45) Date of Patent: May 18, 2010

(54) MULTI-COLOR INKJET INK SET TO PREVENT COLOR BLEEDING

(75) Inventors: Seung-min Ryu, Yongin-si (KR); Yeon-kyoung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 11/470,753

(22) Filed: Sep. 7, 2006

(65) Prior Publication Data
US 2007/0064073 A1    Mar. 22, 2007

(30) Foreign Application Priority Data
Sep. 16, 2005    (KR) .................. 10-2005-0087001

(51) Int. Cl.
C09D 11/02    (2006.01)
B41J 2/01    (2006.01)

(52) U.S. Cl. .............. 106/31.47; 106/31.49; 106/31.77; 106/31.78; 347/100

(58) Field of Classification Search .............. 106/31.46, 106/31.47, 31.49, 31.76, 31.77, 31.78; 347/100
See application file for complete search history.

(56) References Cited

U.S. PATENT DOCUMENTS

| | | | |
|---|---|---|---|
| 4,694,302 A | 9/1987 | Hackleman et al. | |
| 5,156,675 A | 10/1992 | Breton et al. | |
| 5,160,372 A | 11/1992 | Matrick | |
| 5,181,045 A | 1/1993 | Shields et al. | |
| 5,196,056 A | 3/1993 | Prasad | |
| 5,198,023 A | 3/1993 | Stoffel | |
| 5,428,383 A | 6/1995 | Shields et al. | |
| 5,476,540 A | 12/1995 | Shields et al. | |
| 5,700,317 A * | 12/1997 | Adamic .................. | 106/31.58 |
| 5,713,993 A | 2/1998 | Grezzo Page et al. | |
| 5,730,790 A * | 3/1998 | Rehman .................. | 106/31.59 |
| 5,785,743 A * | 7/1998 | Adamic et al. ........... | 106/31.27 |
| 5,958,121 A * | 9/1999 | Lin ........................ | 106/31.43 |
| 6,132,502 A | 10/2000 | Yatake | |
| 6,248,162 B1 | 6/2001 | Gundlach et al. | |
| 6,468,337 B1 * | 10/2002 | Gundlach et al. ........ | 106/31.28 |
| 7,018,452 B2 * | 3/2006 | Yamashita et al. ....... | 106/31.27 |
| 7,296,885 B2 * | 11/2007 | Doi ............................ | 347/100 |
| 7,300,145 B2 * | 11/2007 | Doi ............................ | 347/100 |
| 7,396,398 B2 * | 7/2008 | Lee et al. ................. | 106/31.43 |

FOREIGN PATENT DOCUMENTS

JP    2000-129184    5/2000
JP    2004-143387    5/2004

* cited by examiner

*Primary Examiner*—Helene Klemanski
(74) *Attorney, Agent, or Firm*—Stanzione & Kim, LLP

(57) ABSTRACT

A multi-color inkjet ink set includes a first ink composition including a first colorant and a heterocyclic amine compound, and a second ink composition include a second colorant having an, in which the acid moiety of the second colorant within the second ink composition reacts with the heterocyclic amine compound within the first ink composition to form a precipitate to prevent the second colorant from moving on a printing medium.

18 Claims, No Drawings

MULTI-COLOR INKJET INK SET TO PREVENT COLOR BLEEDING

CROSS-REFERENCE TO RELATED APPLICATIONS

This application claims priority under 35 U.S.C. §119(a) from Korean Patent Application No. 10-2005-0087001, filed on Sep. 16, 2005, in the Korean Intellectual Property Office, the disclosure of which is incorporated herein in its entirety by reference.

BACKGROUND OF THE INVENTION

1. Field of the Invention

This present general inventive concept relates to multi-color inkjet ink compositions, and more particularly, to multi-color inkjet ink sets including a first ink composition comprising a first colorant and a heterocyclic amine compound and a second ink composition comprising a second colorant having an acid moiety to prevent color bleeding at an interface between ink compositions having different colors.

2. Description of the Related Art

An inkjet recording apparatus displays an image on a printing medium by ejecting ink droplets through a nozzle. An inkjet ink should have an excellent drying property on the printing medium, it should not cause image bleeding, it should result in a uniform image regardless of a type of the printing medium, it should not cause color bleeding at an interface between different colors when used to print multiple colors, and it should have excellent durability (water resistance, light resistance, and rubbing resistance).

There have been various attempts to provide a multi-color inkjet ink set that satisfies such requirements, particularly that prevent color bleeding.

A method of adding diethylene glycol monobutyl ether to an ink as a penetrant (U.S. Pat. No. 5,156,675), a method of adding an ester or an amide diol to an ink (U.S. Pat. No. 5,160,372), a method of adding diethylene glycol monobutyl ether and Surfynol 465 to an ink (U.S. Pat. No. 5,196,056), and a method of adding glycol monobutyl ether and a water soluble emulsion to an ink (U.S. Pat. No. 6,132,502) were suggested in order to reduce a drying time of an ink and color bleeding by enhancing a speed within which the ink is penetrated to a printing medium.

In addition, a method of using an anionic ink and a cationic ink (U.S. Pat. No. 5,198,023), a method of using an ink set that forms a gel by a reaction of a gel former and a gel initiator (U.S. Pat. No. 5,476,540), a method of adding a reactive species to an ink that forms a polymer on contacting a paper (U.S. Pat. No. 4,694,302), and a method of adding a multivalent metal salt to an acid colorant (U.S. Pat. No. 5,428,383) were suggested in order to prevent color bleeding through a reaction between inks or between an ink and a printing medium.

For a multi-color inkjet ink set including an ink composition having an acid colorant and an ink composition having a multivalent metal salt among the above conventional methods, a stability of the ink set may be lowered over a long period of time, thereby forming a precipitate, and nozzle clogging at a cartridge and erosion of a head material may occur.

SUMMARY OF THE INVENTION

The present general inventive concept provides a multi-color inkjet ink set to prevent color bleeding at an interface between ink compositions having different colors on a printing medium, thereby providing excellent image quality.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a multi-color inkjet ink set, including a first ink composition comprising a first colorant and a heterocyclic amine compound, and a second ink composition comprising a second colorant having at least one acid moiety to react with the heterocyclic amine compound to form a precipitate.

The heterocyclic amine compound may include an aromatic or non-aromatic amine compound having 4 to 12 carbons.

The heterocyclic amine compound may be selected from a pyrrole derivative, a pyridine derivative, a quinoline derivative, an isoquinoline derivative, a pyrrolidine derivative, and a piperidine derivative.

A mole ratio of the heterocyclic amine compound to the acid moiety of the second colorant may be in a range of about 0.5 to about 10.

At least one of the first ink composition and the second ink composition may further include at least one additive selected a co-solvent, a humectant, a surfactant, a dispersant, a viscosity controller, a storage stabilizer, a pH controller, an antioxidant, and a penetrant.

The first colorant and the second colorant may be selected from a dye, a pigment, a self-dispersible pigment, and mixtures thereof.

An amount of the co-solvent may be in a range of about 1 to about 40 parts by weight based on 100 parts by weight of the at least one of the first and second ink compositions. An amount of the humectant may be in a range of about 1 to about 20 parts by weight based on 100 parts by weight of the at least one of the first and second ink compositions. An amount of the surfactant may be in a range of about 0.1 to about 5 parts by weight based on 100 parts by weight of the at least one of the first and second ink compositions. An amount of the dispersant may be in a range of about 0.1 to about 5 parts by weight based on 100 parts by weight of the at least one of the first and second ink compositions. An amount of the viscosity controller may be in a range of about 0.1 to about 5.0 parts by weight based on 100 parts by weight of the at least one of the first and second ink compositions.

The foregoing and/or other aspects and utilities of the present general inventive concept may also be achieved by providing an ink set, including a first ink composition comprising a first colorant and at least one heterocyclic amine compound, and a second ink composition comprising a second colorant different from the first colorant and having at least one acid moiety to react with the heterocyclic amine compound to form a precipitate.

The at least one heterocyclic amine compound may include an aromatic or a non-aromatic heterocyclic amine compound having 4 to 10 carbons.

The foregoing and/or other aspects and utilities of the present general inventive concept may also be achieved by providing an ink set, including a first ink comprising a first colorant and at least one heterocyclic amine compound, and a second ink comprising an acid colorant having at least one acid moiety to react with the at least one heterocyclic amine compound to precipitate the acid colorant.

A mole ratio of the at least one heterocyclic amine compound to the at least one acid moiety may be in a range of about 1 to about 7. An amount of the first colorant in the first ink may be in a range of about 1 to about 15 parts by weight based on 100 parts by weight of the first ink. An amount of the second colorant in the second ink may be about 1 to about 15 parts by weight based on 100 parts by weight of the second ink. An amount of the heterocyclic amine compound contained in the first ink may be about 0.5 to about 10 parts by weight based on 100 parts by weight of the first ink. The amount of the heterocyclic amine compound contained in the first ink may be about 0.5 to about 20 parts by weight based on 100 parts by weight of the first ink.

The foregoing and/or other aspects and utilities of the present general inventive concept may also be achieved by providing an inkjet printing method, including incorporating into an inkjet printer an inkjet ink set comprising a first ink composition which has a first colorant, at least one heterocyclic amine compound, and a second ink composition which has a second colorant different from the first colorant and having at least one acid moiety to react with the heterocyclic amine compound to form a precipitate, and ejecting droplets of the inkjet ink set in an image-wise pattern onto a printing medium.

The ejecting of the droplets of the inkjet ink set may include selectively heating ink in a nozzle unit of the inkjet printer to cause the droplets of the inkjet ink set to be ejected in the image-wise pattern onto the printing medium. The ejecting of the droplets of the inkjet ink set may include selectively deforming a piezoelectric body in a nozzle unit of the inkjet printer to cause the droplets of the inkjet ink set to be ejected in the image-wise pattern onto the printing medium.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A multi-color inkjet ink set having at least two colors according to an embodiment of the present general inventive concept includes a first ink composition including a first colorant and a heterocyclic amine compound, and a second ink composition including a second colorant having at least one acid moiety that can react with the heterocyclic amine compound to form a precipitate.

The first colorant used in the first ink composition is not particularly limited. For example, a dye that is soluble or dispersible in water, a pigment that is used together with a dispersant and is stably dispersible in water, a self-dispersible pigment that is stably dispersible in water without a separate dispersant, and mixtures thereof can be used as the first colorant.

Specific examples of dyes suitable as the first colorant in the first ink composition include, but are not limited to, Food Black dyes, Food red dyes, Food Yellow dyes, Food Blue dyes, Acid Black dyes, Acid Red dyes, Acid Blue dyes, Acid Yellow dyes, Direct Black dyes, Direct Blue dyes, Direct Yellow dyes, Direct Red dyes, Reactive Blue dyes, Reactive Yellow dyes, Reactive Red dyes, Basic Black, Basic Blue, Basic Red, Basic Yellow, anthraquinone dyes, monoazo dyes, disazo dyes, and phthalocyanine dyes. Specific examples of pigments suitable as the first colorant include carbon black, graphite, vitreous carbon, activated charcoal, activated carbon, anthraquinone, phthalocyanine blue, phthalocyanine green, diazos, monoazos, pyranthrones, perylene, quinacridone, indigoid and surface modified self-dispersible pigments.

An amount of the first colorant in the first ink composition may be in a range of about 1 to about 15 parts by weight based on 100 parts by weight of the first ink composition. For example, the amount of the first colorant in the first ink composition may be in a range of about 1 to about 10 parts by weight based on 100 parts by weight of the first ink composition.

The heterocyclic amine compound used in the first ink composition may be, but is not limited to, an aromatic or a non-aromatic heterocyclic amine compound having 4 to 12 carbons (such as an aromatic or a non-aromatic heterocyclic amine compound having 4 to 10 carbons), such as a pyrrole derivative, a pyridine derivative, a quinoline derivative, an isoquinoline derivative, a pyrrolidine derivative, and a piperidine derivative. The derivatives may be compounds in which a hydrogen atom therein is substituted with, for example, a hydroxy group, a substituted or unsubstituted alkylene group having 1 to 15 carbons, a substituted or unsubstituted heteroalkylane group, a substituted or unsubstituted arylene group, a substituted or unsubstituted heteroarylene group, a halogen atom, an amino group, or a nitro group. Specific examples of the derivatives include, but are not limited to, a hydroxy piperidine, a methyl pyrrolidine, a methyl piperidine, a methyl pyridine, an aminopyridine, a bromopyridine, a chloropyridine, a nitroquinoline, a nitroisoquinoline, an aminoquinoline, and a methyl isoquinoline. For example, the derivative may be 3-hydroxy piperidine or 2,3-diaminopyridine.

The second colorant of the second ink composition is an acid colorant having at least one acid moiety that can react with the heterocyclic amine compound to form a precipitate. The acid moiety may be, for example, a carboxylic acid group, a sulfuric acid group, a phosphoric acid group, or a salt thereof. At least one acid moiety can be included within a colorant molecule. The heterocyclic amine of the first ink composition reacts with the acid moiety of the second ink composition to form a precipitate. As a result, the second colorant of the second ink composition cannot be moved on a printing medium, thereby reducing bleeding between colors. Furthermore, an effect of reducing the mobility of the second colorant can be further increased due to an affinity between the heterocyclic amine compound and cellulose of the printing medium. In addition, the heterocyclic amine compound imparts excellent storage stability to the first ink composition due to a good affinity to water, and thus does not cause precipitation within the first ink composition or nozzle clogging, unlike a multivalent metal salt used in a conventional ink composition.

An amount of the second colorant used in the second ink composition may be about 1 to about 15 parts by weight based on 100 parts by weight of the second ink composition. For example, the amount of the second colorant used in the second ink composition may be about 1 to about 10 parts by weight based on 100 parts by weight of the second ink composition.

A mole ratio of the heterocyclic amine compound contained in the first ink composition to the acid moiety of the second colorant contained in the second ink composition may be in a range of about 0.5 to about 10. For example, the mole ratio of the heterocyclic amine compound contained in the first ink composition to the acid moiety of the second colorant contained in the second ink composition may be in a range of about 1.0 to about 7.0. If the mole ratio is less than about 0.5, the precipitation does not occur, and thus the effect of preventing bleeding between colors may be insignificant. If the mole ratio exceeds about 10, an ink ejection performance can be deteriorated.

Furthermore, an amount of the heterocyclic amine compound contained in the first ink composition may be about 0.5~20 parts by weight based on 100 parts by weight of the first ink composition. For example, the amount of the heterocyclic amine compound contained in the first ink composition may be about 1~15 parts by weight based on 100 parts by weight of the first ink composition.

The first ink composition and/or the second ink composition may further include a co-solvent. The co-solvent may be, for example, an organic solvent, and the co-solvent may dissolve or disperse a colorant together with water. The co-solvent may be, but is not limited to, an alcohol compound (such as methyl alcohol, ethyl alcohol, n-propyl alcohol, isopropyl alcohol, n-butyl alcohol, sec-butyl alcohol, t-butyl alcohol, and isobutyl alcohol), a ketone compound (such as acetone, methylethyl ketone, diethyl ketone, and diacetone alcohol), an ester compound (such as methyl acetate, ethyl acetate, and ethyl lactate), a polyhydric alcohol compound (such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, and trimethylolpropane ethoxylate), a nitrogen-containing compound (such as 2-pyrrolidone and N-metyl-2-pyrrolidone), and a sulfur-containing compound (such as dimethyl sulfoxide, tetramethylene sulfone, and thioglycol). An amount of the co-solvent in the first or second ink composition may be in a range of about 1 to about 40 parts by weight based on 100 parts by weight of the first or second ink composition, respectively.

The first ink composition and/or the second ink composition may further include a humectant to prevent the first and/or second ink composition from being clogged in a nozzle. The humectant may be, for example, a polyhydric alcohol. Specific examples of the humectant include, but are not limited to, glycerine, ethylene glycol, diethylene glycol, triethylene glycol, propylene glycol, dipropylene glycol, hexylene glycol, 1,3-butanediol, 1,4-butanediol, 1,5-pentanediol, 2-butene-1,4-diol, 2-methyl-2-pentanediol, and a mixture thereof. An amount of the humectant in the first or second ink composition may be in a range of about 1 to about 20 parts by weight based on 100 parts by weight of the first or second ink composition, respectively.

The first ink composition and/or the second ink composition may further include a surfactant to control a surface tension of the first and/or ink composition, respectively, to stabilize a jetting performance, and to control a degree that the first and/or second ink composition, respectively, is penetrated to a printing medium. The surfactant may be, for example, an anionic surfactant, a cationic surfactant, or a nonionic surfactant. Specific examples of an anionic surfactant include, but are not limited to, a C1-C1000 alkyl carboxylate (such as a C10-C200 alkyl carboxylate), a C1-C1000 alkyl sulfonic esterate (such as a C10-C200 alkyl sulfonic esterate), a C1-C1000 alkyl sulfonate (such as a C10-C200 alkyl sulfonate), a C1-C1000 alkylbenzene sulfonate (such as a C10-C200 alkylbenzene sulfonate), and mixtures thereof. Specific examples of a cationic surfactant include, but are not limited to, a fatty acid amine salt, a quaternary ammonium salt, a sulfonium salt, a phosphonium salt, and mixtures thereof. Specific examples of a nonionic surfactant include, but are not limited to, polyoxyethylene alkyl ether (in which the alkyl is a C1-C1000 alkyl group, such as a C10-C200 alkyl group), polyoxyethylene alkyl phenyl ether (in which the alkyl is a C1-C1000 alkyl group, such as a C10-C200 alkyl group), polyoxyethylene secondary alcohol ether, polyoxyethylene-oxypropylene block copolymer, polyglycerine fatty acid ester, sorbitan fatty acid ester, and mixtures thereof. An amount of the surfactant in the first or second ink composition may be in a range of about 0.1 to about 5 parts by weight based on 100 parts by weight of the first or second ink composition, respectively.

Further, when the first and/or second colorant is not a self-dispersible pigment, or when the first and/or second colorant is a dye insoluble in water, the first and/or second ink composition, respectively, may further include at least one dispersant to stabilize a dispersion of the first and/or second colorant. The dispersant not particularly limited. Thus, the dispersant may be a low molecular weight dispersant that has a relatively simple structure, or a high molecular weight dispersant, such as a block copolymer that may limit chemical properties, stability, and functionality.

Specific examples of the low molecular weight dispersant that has a relatively simple structure include, but are not limited to, polyvinyl alcohol (PVA), cellulosics, ethylene oxide modified phenols, ethylene oxide/propylene oxide polymer, a sodium polyacrylate solution (manufactured by TEGO, e.g., disperse 715 W), a denatured polyacryl resin solution (manufactured by TEGO, e.g., disperse 735 W), an alkylol ammonium solution of a low molecular polycarboxylic acid polymer (manufactured by BYK-Chemie, e.g., Disperbyk), an alkylol ammonium solution of a polyfucntional polymer (manufactured by BYK-Chemie, e.g., Disperbyk-181), and mixtures thereof.

Specific examples of the high molecular weight dispersant that has a complex structure include, but are not limited to, siloxane series, such as a polyether siloxane copolymer (manufactured by TEGO, e.g., Wet KL 245/Wet 260), and a hydrophilic polymer having AB or BAB structure (in which A is a hydrophobic homopolymer or copolymer of a substituted or unsubstituted C1-C30 acrylic monomer, and B is a hydrophilic homopolymer or copolymer of a substituted or unsubstituted C1-C30 acrylic monomer). For example, the high molecular weight dispersant that has a complex structure may be an acrylic acid/acrylate copolymer, a methacrylic acid/methacrylate copolymer, an acrylic acid/polydialkylsiloxane/acrylate block copolymer, and mixtures thereof. An amount of the dispersant in the first or second ink composition may be in a range of about 0.1 to about 5 parts by weight based on 100 parts by weight of the first or second ink composition, respectively.

The first ink composition and/or the second ink composition may further include a viscosity controller to control a viscosity of the first and/or second ink composition, respectively, to maintain a smooth jetting thereof from a nozzle. Specific examples of the viscosity controller include, but are not limited to, casein, hydroxymethyl cellulose, hydroxyethyl cellulose, and carboxymethyl cellulose. An amount of the viscosity controller in the first or second ink composition may be in a range of about 0.1 to about 5.0 parts by weight based on 100 parts by weight of the first or second ink composition, respectively.

The first ink composition and/or the second ink composition may further include additional additives, such as a storage stabilizer, a pH controller, an antioxidant, and a penetrant.

The present general inventive concept will be described in greater detail with reference to the following examples and comparative examples. The following examples are for illustrative purposes only and are not intended to limit the scope of the general inventive concept.

EXAMPLES

A colorant, a heterocyclic amine and other additives were mixed together, and water was added to obtain 100 g mixture. Then, the mixture was stirred sufficiently in a stirrer for 30 minutes to reach a homogeneous state, and the homogenous mixture was filtered through 0.45 μm filter to obtain first second ink compositions of Examples 1-4 and Comparative Examples 1-3, as described in the following tables. In following tables, % means % by weight based on 100 parts by weight of the respective ink composition.

Example 1

| Ink set 1 | Colorant | Heterocyclic amine | Other additives |
| --- | --- | --- | --- |
| First ink composition | D.B.199 (5.0%) | 2-hydroxypyridine (5.0%) | DEG (10%), 2-Pyrrolidone (2%) |
| Second ink composition | A.Y.23 (5.0%) | — | EG (10%), 2-Pyrrolidone (8%) |

Example 2

| Ink set 2 | Colorant | Heterocyclic amine | Other additives |
| --- | --- | --- | --- |
| First ink composition | D.Bk.19 (5.0%) | 2,3-diaminopyridine (7.0%) | Glycerine (8%) |
| Second ink composition | A.B.9 (4.0%) | — | DEG (10%), 2-Pyrrolidone (5%) |

Example 3

| Ink set 3 | Colorant | Heterocyclic amine | Other additives |
| --- | --- | --- | --- |
| First ink composition | R.Bk.6 (5.0%) | 3-hydroxypiperidine (1%) | 1,5-pentanediol(7%), Caprolactam(3%) |
| Second ink composition | D.Y.132 (4.5%) | — | EG (9%), NMP (3%) |

Example 4

| Ink set 4 | Colorant | Heterocyclic amine | Other additives |
| --- | --- | --- | --- |
| First ink composition | R.R.180 (4.5%) | 2,3-diaminopyridine (10.0%) | EG (5%), NMP(1%) |
| Second ink composition | Cabojet-300 (5.0%) | — | 1,5-Pentanediol (6%), 2-Pyrrolidone (4%) |

Comparative Example 1

| Ink set 5 | Colorant | Heterocyclic amine | Other additives |
| --- | --- | --- | --- |
| First ink composition | D.B.199 (5.0%) | — | DEG (10%), 2-Py (2%) |
| Second ink composition | A.Y.23 (5.0%) | — | EG (10%), 2-Py (8%) |

Comparative Example 2

| Ink set 6 | Colorant | Heterocyclic amine | Other additives |
| --- | --- | --- | --- |
| First ink composition | D.Bk.19 (5.0%) | 3-hydroxypiperidine (0.3%) | 1,5-pentanediol(7%), Caprolactam(3%) |
| Second ink composition | A.B.9 (5.0%) | — | EG (9%), NMP (3%) |

Comparative Example 3

| Ink set 7 | Colorant | Metal salt | Other additives |
| --- | --- | --- | --- |
| First ink composition | D.Bk.19 (5.0%) | $CaCl_2$ (5.0%) | EG (6%), NMP(4%) |
| Second ink composition | D.Y.132 (5.0%) | | 1,5-Pentanediol (6%), 2-Pyrrolidone (4%) |

Experimental Example 1

Storage Stability of Ink 100 ml of the first ink compositions and the second ink compositions obtained from Examples 1-4 and Comparative Examples 1-3 were respectively placed into heat resistant vials, the opening of the vials was closed, and the vials were stored in an incubator at 60° C. After storing for 2 months, the vials were examined to determine whether precipitates were formed or layers were separated at the bottom of the vials. The results are described in Table 1 below, based on the following criteria:

⊚: no precipitates, no layer separation, viscosity change ≦5%
○: no precipitates, no layer separation, viscosity change ≦10%.
Δ: no precipitates, layer separation occurred.
×: precipitates occurred.

Experimental Example 2

Evaluation for Bleeding Between Colors

Of the ink compositions obtained from Examples 1-4 and Comparative Examples 1-3, color inks were refilled in an ink cartridge C-60 (manufactured by Samsung Electronics Co., Ltd.), and black inks were refilled in an ink cartridge M-50 (manufactured by Samsung Electronics Co., Ltd.). Then, after printing each adjacently on a general paper using a printer (MJC-3300p, manufactured by Samsung Electronics Co., Ltd.) to form images, a degree of bleeding between colors at an interface was evaluated with naked eyes. The results are described in Table 1 below, based on the following criteria:

⊚: no bleeding between colors occurred.
○: a little bleeding between colors occurred.
×: bleeding between colors occurred seriously.
××: bleeding between colors occurred too seriously.

Experimental Example 3

Evaluation for Nozzle Clogging

Of the ink compositions obtained from Examples 1-4 and Comparative Examples 1-3, color inks were refilled in an ink cartridge C-60 (manufactured by Samsung Electronics Co., Ltd.), and black inks were refilled in an ink cartridge M-50 (manufactured by Samsung Electronics Co., Ltd.). Then, when printing after standing for 2 weeks at ambient temperature (25° C.) and low temperature (−18° C.) using a printer (MJC-3300p, manufactured by Samsung Electronics Co., Ltd.), a number of times that nozzles needed to be cleaned for normal printing was determined. The results are described in Table 1 below, based on the following criteria:

TABLE 1

|  | Ink set1 | Ink set2 | Ink set3 | Ink set4 | Ink set5 | Ink set6 | Ink set7 |
| --- | --- | --- | --- | --- | --- | --- | --- |
| Storage stability of ink | ◎/◎ | ◎/○ | ◎/○ | ◎/○ | ○/◎ | ○/○ | X/○ |
| Color bleeding | ◎ | ◎ | ○ | ◎ | XX | X | ○ |
| Nozzle clogging | ◎/◎ | ◎/○ | ○/○ | ◎/○ | ○/◎ | ○/○ | X/○ |

◎: normal printing was possible when cleaning nozzles one time
○: normal printing was possible when cleaning nozzles 2 to 4 times
X: normal printing was possible when cleaning nozzles 5 to 10 times
XX: normal printing was not possible even when cleaning nozzles 10 times.

As described in Table 1, an inkjet ink set according to embodiments of the present general inventive concept have an excellent storage stability over a long period of time, and does not cause nozzle clogging and color bleeding when printing on a printing medium, as compared to a conventional inkjet ink set. In contrast, ink set 5 (Comparative Example 1) having no heterocyclic amine resulted in undesirable color bleeding, ink set 6 (Comparative Example 2) having too low an amount of a heterocyclic amine also resulted in undesirable color bleeding, and ink set 7 (Comparative Example 3) having a metal salt and no heterocyclic amine resulted in undesirable precipitation and undesirable nozzle clogging.

The present general inventive concept provides a multi-color inkjet ink set including a first ink composition including a first colorant and a heterocyclic amine compound, and a second ink composition including a second colorant having at least one acid moiety that can react with the heterocyclic amine compound to form a precipitate. Thus, since the second colorant of the second ink composition cannot move due to precipitation of the second colorant, the multi-color inkjet ink set according to the present general inventive concept can reduce bleeding between different colors and can display a high quality image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-color inkjet ink set, comprising:
 a first ink composition comprising a first colorant and a heterocyclic amine compound; and
 a second ink composition comprising a second colorant having at least one acid moiety to react with the heterocyclic amine compound to form a precipitate,
 wherein a mole ratio of the heterocyclic amine compound to the at least one acid moiety is in a range of greater than 0.5 to about 10,
 wherein the heterocyclic amine compound is at least one member selected from the group consisting of a pyrrole derivative, a pyridine derivative, a quinoline derivative, an isoquinoline derivative, a pyrrolidine derivative, and a piperidine derivative, and
 wherein the derivative is a compound in which a hydrogen atom therein is substituted with one member selected from the group consisting of, a hydroxy group, a substituted or unsubstituted alkylene group having 1 to 15 carbons, a substituted or unsubstituted heteroalkylane group, a substituted or unsubstituted arylene group, a substituded or unsubstituded heteroarylene group, a halogen atom, an amino group, and a nitro group.

2. The multi-color inkjet ink set of claim 1, wherein the heterocyclic amine compound comprises:
 an aromatic or non-aromatic amine compound having 4 to 12 carbons.

3. The multi-color inkjet ink set of claim 1, wherein the acid moiety is at least one member selected from the group consisting of a carboxylic acid group, a sulfuric acid group, a phosphoric acid group, and salts thereof.

4. The multi-color inkjet ink set of claim 1, wherein at least one of the first ink composition and the second ink composition further comprises:
 at least one additive selected from the group consisting of a co-solvent, a humectant, a surfactant, a dispersant, a viscosity controller, a storage stabilizer, a pH controller, an antioxidant, and a penetrant.

5. The multi-color inkjet ink set of claim 4, wherein an amount of the co-solvent is in a range of about 1 to about 40 parts by weight based on 100 parts by weight of the at least one of the first and second ink compositions.

6. The multi-color inkjet ink set of claim 4, wherein an amount of the humectant is in a range of about 1 to about 20 parts by weight based on 100 parts by weight of the at least one of the first and second ink compositions.

7. The multi-color inkjet ink set of claim 4, wherein an amount of the surfactant is in a range of about 0.1 to about 5 parts by weight based on 100 parts by weight of the at least one of the first and second ink compositions.

8. The multi-color inkjet ink set of claim 4, wherein an amount of the dispersant is in a range of about 0.1 to about 5 parts by weight based on 100 parts by weight of the at least one of the first and second ink compositions.

9. The multi-color inkjet ink set of claim 4, wherein an amount of the viscosity controller is in a range of about 0.1 to about 5.0 parts by weight based on 100 parts by weight of the at least one of the first and second ink compositions.

10. The multi-color inkjet ink set of claim 1, wherein the first colorant and the second colorant are selected from the group consisting of a dye, a pigment, a self-dispersible pigment, and mixtures thereof.

11. An ink set, comprising:
 a first ink comprising a first colorant and at least one heterocyclic amine compound; and
 a second ink comprising an acid colorant having at least one acid moiety to react with the at least one heterocyclic amine compound to precipitate the acid colorant,
 wherein a mole ratio of the at least one heterocyclic amine compound to the at least one acid moiety is in a range of greater than 0.5 to about 10,
 wherein the heterocyclic amine compound is at least one member selected from the group consisting of a pyrrole derivative, a pyridine derivative, a quinoline derivative, an isoquinoline derivative, a pyrrolidine derivative, and a piperidine derivative, and
 wherein the derivative is a compound in which a hydrogen atom therein is substituted with one member selected from the group consisting of, a hydroxy group, a substituted or unsubstituted alkylene group having 1 to 15 carbons, a substituted or unsubstituted heteroalkylane group, a substituted or unsubstituted arylene group, a substituted or unsubstituted heteroarylene group, a halogen atom, an amino group, and a nitro group.

12. The ink composition of claim 11, wherein an amount of the first colorant in the first ink is in a range of about 1 to about 15 parts by weight based on 100 parts by weight of the first ink.

13. The ink composition of claim 11, wherein an amount of the second colorant in the second ink is about 1 to about 15 parts by weight based on 100 parts by weight of the second ink.

14. The ink composition of claim 11, wherein an amount of the heterocyclic amine compound contained in the first ink is about 0.5 to about 20 parts by weight based on 100 parts by weight of the first ink.

15. The ink composition of claim 11, wherein an amount of the heterocyclic amine compound contained in the first ink is about 1 to about 15 parts by weight based on 100 parts by weight of the first ink.

16. An inkjet printing method, comprising:
 incorporating into an inkjet printer an inkjet ink set comprising a first ink composition which has a first colorant, at least one heterocyclic amine compound, and a second ink composition which has a second colorant different from the first colorant and having at least one acid moiety to react with the heterocyclic amine compound to form a precipitate, and wherein a mole ratio of the at least one heterocyclic amine compound to the at least one acid moiety is in a range of greater than 0.5 to about 10; and
 ejecting droplets of the inkjet ink set in an image-wise pattern onto a printing medium,
 wherein the heterocyclic amine compound is at least one member selected from the group consisting of a pyrrole derivative, a pyridine derivative, a quinoline derivative, an isoquinoline derivative, a pyrrolidine derivative, and a piperidine derivative, and
 wherein the derivative is a compound in which a hydrogen atom therein is substituted with one member selected from the group consisting of, a hydroxy group, a substituted or unsubstituted alkylene group having 1 to 15 carbons, a substituted or unsubstituted heteroalkylane group, a substituted or unsubstituted arylene group, a substituted or unsubstituted heteroarylene group, a halogen atom, an amino group, and a nitro group.

17. The method of claim 16, wherein the ejecting of the droplets of the inkjet ink set comprises:
 selectively heating ink in a nozzle unit of the inkjet printer to cause the droplets of the inkjet ink set to be ejected in the image-wise pattern onto the printing medium.

18. The method of claim 16, wherein the ejecting of the droplets of the inkjet ink set comprises:
 selectively deforming a piezoelectric body in a nozzle unit of the inkjet printer to cause the droplets of the inkjet ink set to be ejected in the image-wise pattern onto the printing medium.

* * * * *